(12) United States Patent
Larson

(10) Patent No.: US 7,922,009 B1
(45) Date of Patent: Apr. 12, 2011

(54) MOTORIZED BICYCLE STORAGE AND RETRIEVAL ASSEMBLY

(76) Inventor: Roger Charles Larson, White Bear Lake, MN (US)

( * ) Notice: Subject to any disclaimer, the term of this patent is extended or adjusted under 35 U.S.C. 154(b) by 517 days.

(21) Appl. No.: 12/070,581

(22) Filed: Feb. 19, 2008

Related U.S. Application Data

(60) Provisional application No. 60/902,478, filed on Feb. 21, 2007.

(51) Int. Cl.
*A47F 7/00* (2006.01)

(52) U.S. Cl. ............................................ 211/17; 211/20

(58) Field of Classification Search ................ 211/5, 17, 211/19–22, 24, 85.7; 414/462; 224/310, 224/509, 924
See application file for complete search history.

(56) References Cited

U.S. PATENT DOCUMENTS

| | | | | |
|---|---|---|---|---|
| 639,517 | A | * | 12/1899 | Butcher ............................ 211/5 |
| 3,770,133 | A | * | 11/1973 | Kolker ............................ 211/19 |
| 3,843,001 | A | * | 10/1974 | Willis ............................ 414/462 |
| 3,861,533 | A | * | 1/1975 | Radek ............................ 211/20 |
| 3,883,002 | A | * | 5/1975 | Moore ............................ 211/18 |
| 4,573,854 | A | * | 3/1986 | McFarland ..................... 414/462 |
| 4,826,387 | A | * | 5/1989 | Audet ............................ 414/462 |
| 4,932,829 | A | * | 6/1990 | Miller ............................ 414/462 |
| 5,850,891 | A | * | 12/1998 | Olms et al. ..................... 182/127 |
| 5,988,403 | A | * | 11/1999 | Robideau ........................ 211/20 |
| 6,382,480 | B1 | * | 5/2002 | Egly et al. .................. 224/42.33 |
| 6,413,033 | B1 | * | 7/2002 | Monroig, Jr. .................. 414/480 |
| 6,619,620 | B1 | * | 9/2003 | Carter ......................... 254/10 C |
| 6,883,649 | B2 | | 4/2005 | Lun |
| 7,472,517 | B2 | * | 1/2009 | Blume ............................ 52/79.1 |
| 7,481,027 | B2 | * | 1/2009 | Blume ............................ 52/79.1 |

FOREIGN PATENT DOCUMENTS

| | | | |
|---|---|---|---|
| FR | 2587691 A2 | * | 3/1987 |
| JP | 05213248 A | * | 8/1993 |
| JP | 05221355 A | * | 8/1993 |

OTHER PUBLICATIONS

Gen 3 Rod Guide Offered For Sale In The United States On Or About Oct. 1, 2006.

* cited by examiner

*Primary Examiner* — Darnell M Jayne
*Assistant Examiner* — Stanton L Krycinski
(74) *Attorney, Agent, or Firm* — Anthony G. Eggink; Katrina M. Eggink

(57) ABSTRACT

A motorized bicycle storage and retrieval assembly for loading, storing and unloading bikes. The storage assembly is mountable within or to the top of existing bicycle storage racks. The storage assembly has a frame, a lower track, an upper track and a motor assembly and windable cable interconnects the lower and upper trolley track. The upper track has front and rear bike wheel securement structures which secure a bike to the upper track. A plate assembly is provided to pivot the upper trolley track with respect to the lower trolley track to load and unload bikes. The motorized assembly includes a gear reduction device, a brake device, a wound cable and a switch mechanism to operate the bicycle storage assembly. Further, a safety mechanism is provided to lock the upper track to the lower track.

17 Claims, 7 Drawing Sheets

MOTORIZED BICYCLE STORAGE AND RETRIEVAL ASSEMBLY

This application claims the benefit of U.S. Provisional Application Ser. No. 60/902,478, filed on Feb. 21, 2007.

BACKGROUND OF THE INVENTION

This invention relates generally to a bicycle storage and retrieval assembly and particularly to a motorized storage assembly for loading, storing and unloading bicycles and which is mountable to a bicycle storage rack. More particularly, the invention relates to an automated, motorized storage assembly for loading and unloading bicycles to and from an elevated storage position.

As disclosed in pending U.S. patent application Ser. No. 11/329,441, filed on Jan. 11, 2006, entitled Bicycle Storage and Retrieval Assembly, Applicant provides several embodiments for a manually operated storage assembly for bicycles. One such embodiment relates to a manually operated bicycle storage assembly which uses a tool member to aid in the loading and unloading of bikes from high storage positions, i.e., a third bike storage level.

The disclosure of the Ser. No. 11/329,441 is fully incorporated by reference into this application. The motorized bicycle storage and retrieval assembly of the present invention utilizes common components to the embodiments disclosed in the '441 Application, however, several components have been eliminated and other components have been added to provide an automated, motorized bicycle storage assembly which is activated by a power switch to load and unload bikes from an elevated position.

The motorized bicycle storage assembly of the invention provides a quick and easy manner to store and retrieve bicycles from elevated storage locations and permits relatively short personnel to utilize a bike storage system without requiring extraordinary strength.

SUMMARY OF THE INVENTION

The motorized bicycle storage and retrieval assembly of the invention comprises a frame structure holding a lower track and an upper track on which a bicycle may be secured. The upper track moves with respect to and may pivot with respect to the lower track. The present invention utilizes a motor assembly, with a rotatable shaft and a wound cable thereon which is mounted at the upper end of the lower track and connected to and operative on the upper track. The motor assembly is activated by a remote switch, accessible to the user in either a forward or reverse position to thereby wind or unwind the cable to thereby load or to unload a bike.

A cable is wound on the rotatable shaft and is connected to the end of the upper track to thereby move and control the movement of the upper track with respect to the lower track. The upper track has a front wheel holder structure and a movable or slidable rear wheel holder structure to secure a bicycle to the upper track. These structures are shown and described in the '441 Application.

A movable and pivotable plate device is provided for movement in the lower track to guide the cable and to provide the secure pivoting motion of the upper track with respect to the lower track. The pivotable plate has a pair of dogs which engage apertures in the bottom of the lower track so that the release of the upper track rear wheel rollers from the lower track side openings allows the controlled pivoting of the bicycle on the upper track for removal.

Upper and lower limit stop switches are also provided to control the motor assembly. The motor assembly is preferably a small AC or DC operated motor with an attached gear reduction device so that the cable can be wound on and unwound from the rotatable shaft. For example, a small DC motor capable of generating approximately 40 pounds of torque has been found suitable for the present application. An AC/DC converter is provided to power the DC motor.

The motor assembly is further provided with a brake device to limit shaft rotation and a safety mechanism comprising a plurality of apertures in the lower track with a cooperating pivotable pawl connected to the upper track. These devices are provided as safeguards to secure the upper track to the lower track.

These and other benefits of this invention will become clear from the following description by reference to the drawings.

DESCRIPTION OF THE PREFERRED EMBODIMENTS

Figure 1:
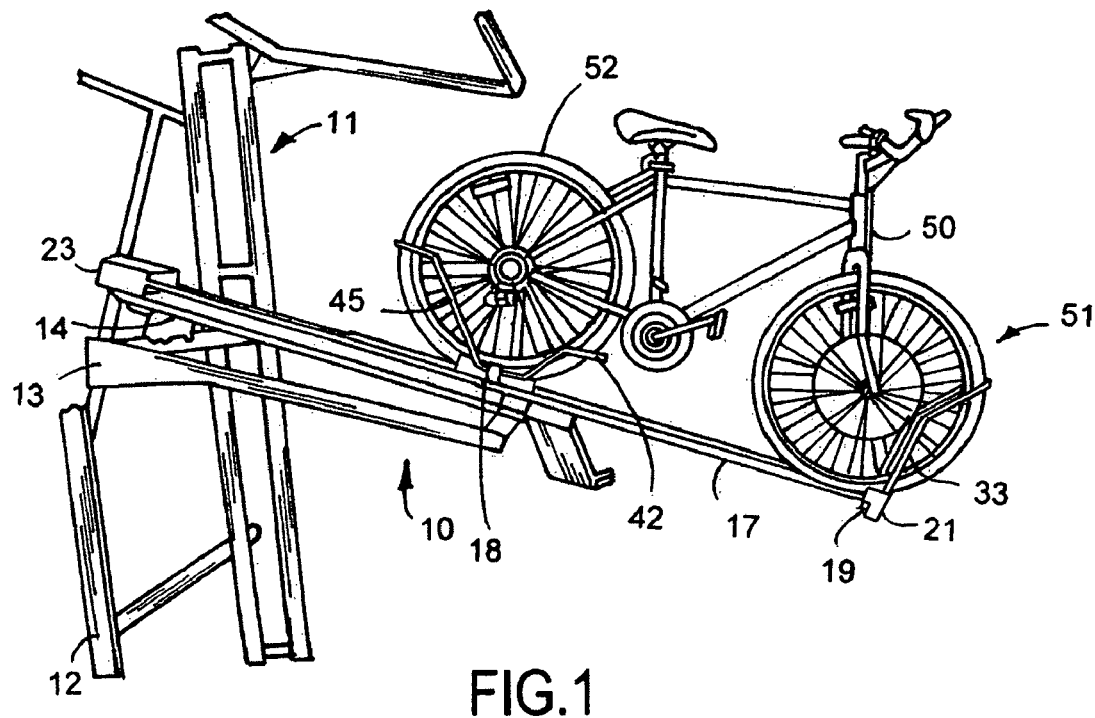
FIG. 1 is a perspective view of the motorized bicycle storage and retrieval assembly of the present invention.

The motorized bicycle storage and retrieval assembly of the invention may be used within a storage rack or on top of an existing storage rack, the latter being a third or elevated storage level, for example. The assembly comprises a frame structure, a lower track, an upper track with front wheel securement means and with a cooperating movable trolley having rear wheel securement means. Although using common components of the assemblies disclosed in the pending '441 Application, the biasing means provided to interconnect the lower and upper tracks has been eliminated and other components have been added to the motorized storage assembly of the present invention.

Referring to FIGS. 1-4, the motorized bicycle storage and retrieval assembly 10 is shown having a stationary lower track 14 mounted with legs 15 and 16 onto frame structures 12 and 13 of a bicycle rack 11. An upper track 17 is shown in sliding communication with stationary track 14. A rolling trolley structure 18 and front wheel holder 19 with front wheel safety release 21 is shown holding bicycle 50 on upper track 17 of the assembly 10. Front wheel capture 33 is shown disposed on the front end of upper track 17 and which holds front wheel 51 in place. Front and rear wheel retention structures 42 and 45 are shown extending from body 41 of rolling trolley 18 to hold rear wheel 52 in place. Rear wheel lock 24 further secures rear wheel 52 in trolley 18 and may be constructed and arranged to prevent fingers or other articles from being pinched when utilized. Rolling trolley 18 is constructed and arranged having rollers (not shown) which are constructed and arranged to roll within channels 35 and 36 of upper track 17 to permit movement of rolling trolley 18 with respect to upper track 17.

Figure 2:
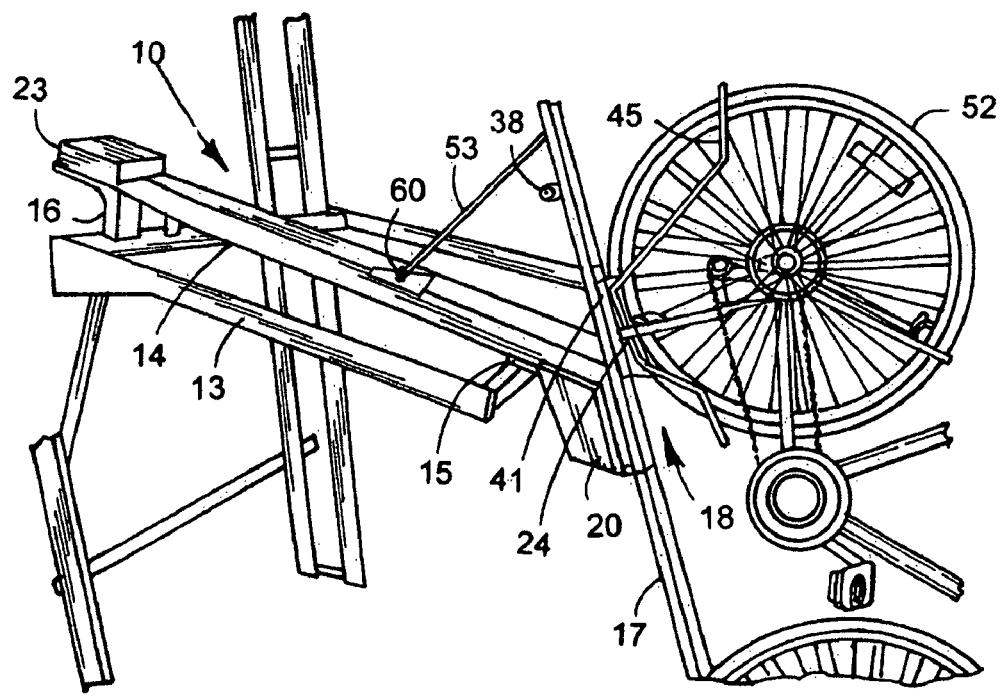
FIG. 2 is a perspective view showing a bicycle secured to the upper track in a pivoted relationship to the lower track.
Figure 3:
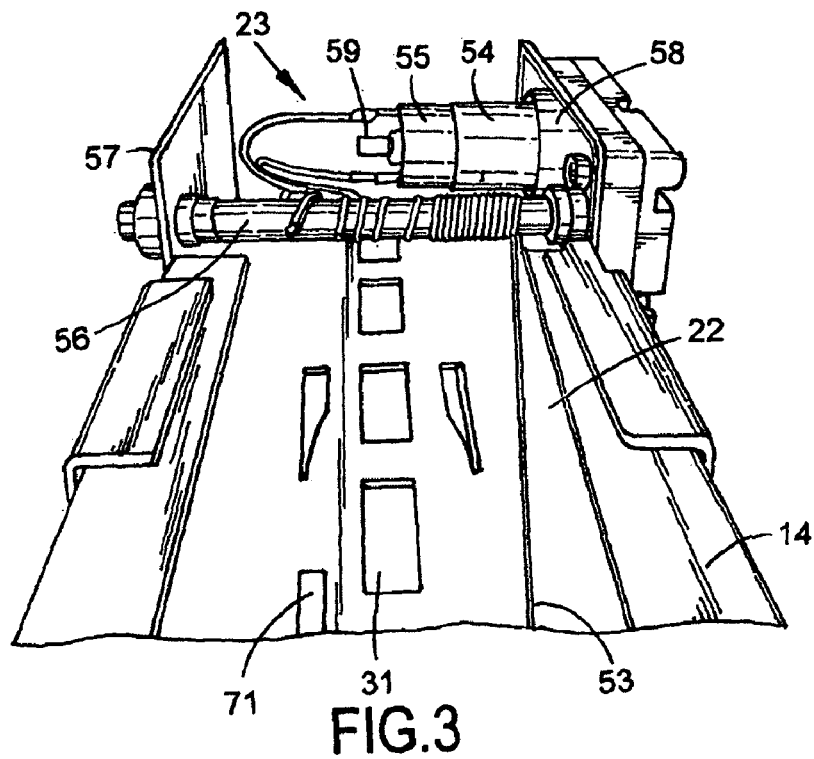
FIG. 3 is a perspective view showing the motor assembly mounted to the upper end of the lower track.
Figure 4:
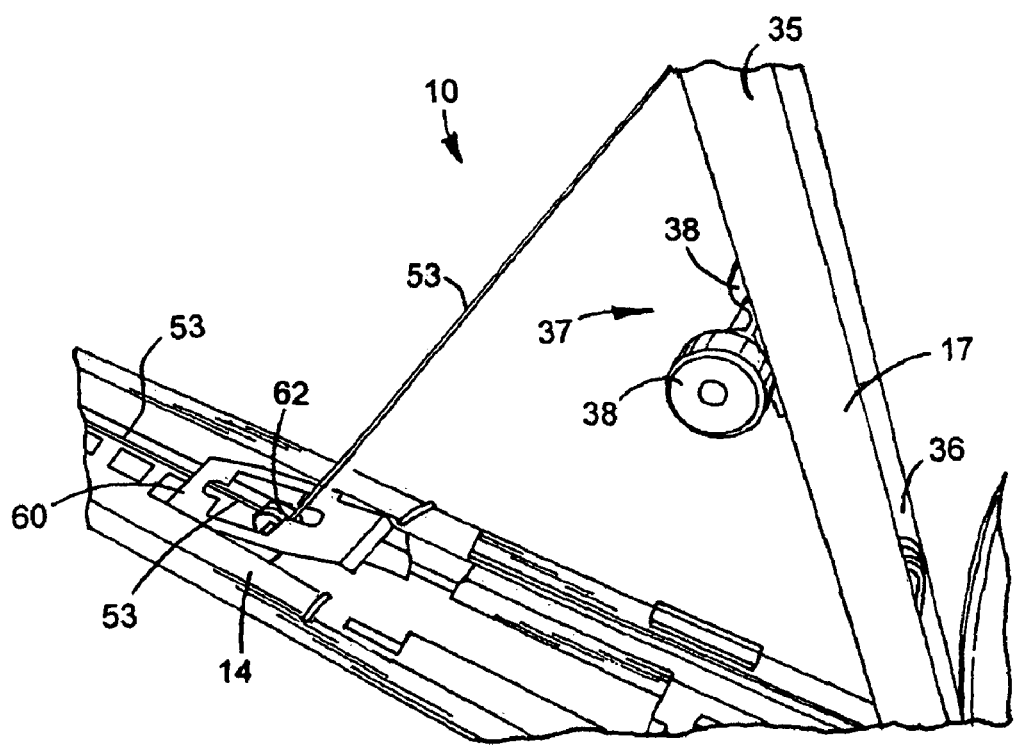
FIG. 4 is a perspective view showing the upper track pivotably held by a cable with respect to the lower track.
Figure 5:
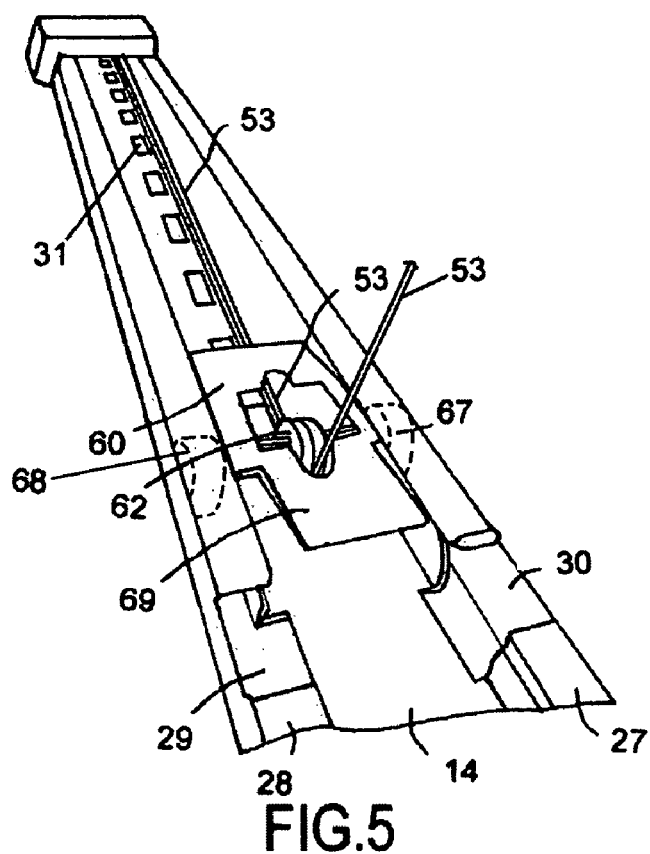
FIG. 5 is a perspective view showing the pivotable plate assembly used in the lower track.
Figure 6:
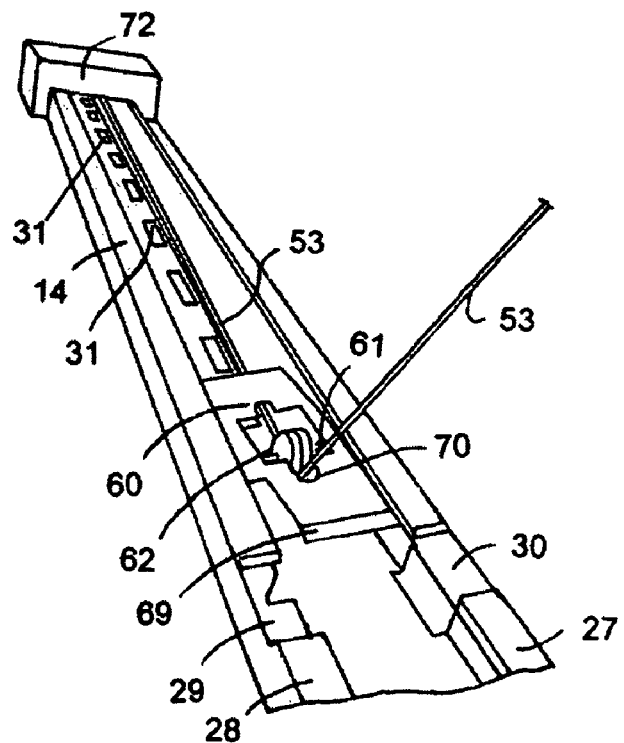
FIG. 6 is another perspective view of the pivotable plate assembly.
Figure 7:
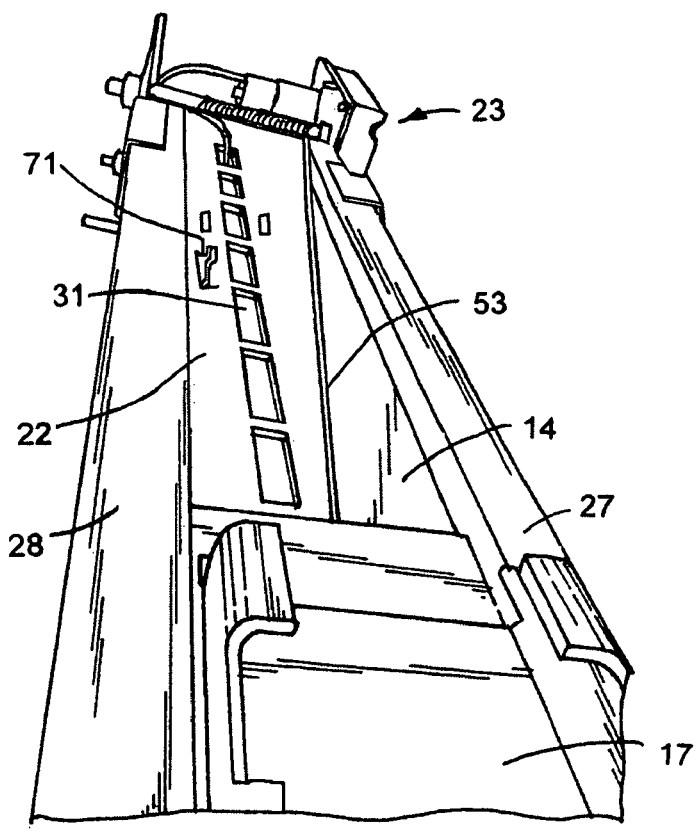
FIG. 7 is a perspective view showing the upper track and the lower track.
Figure 10:
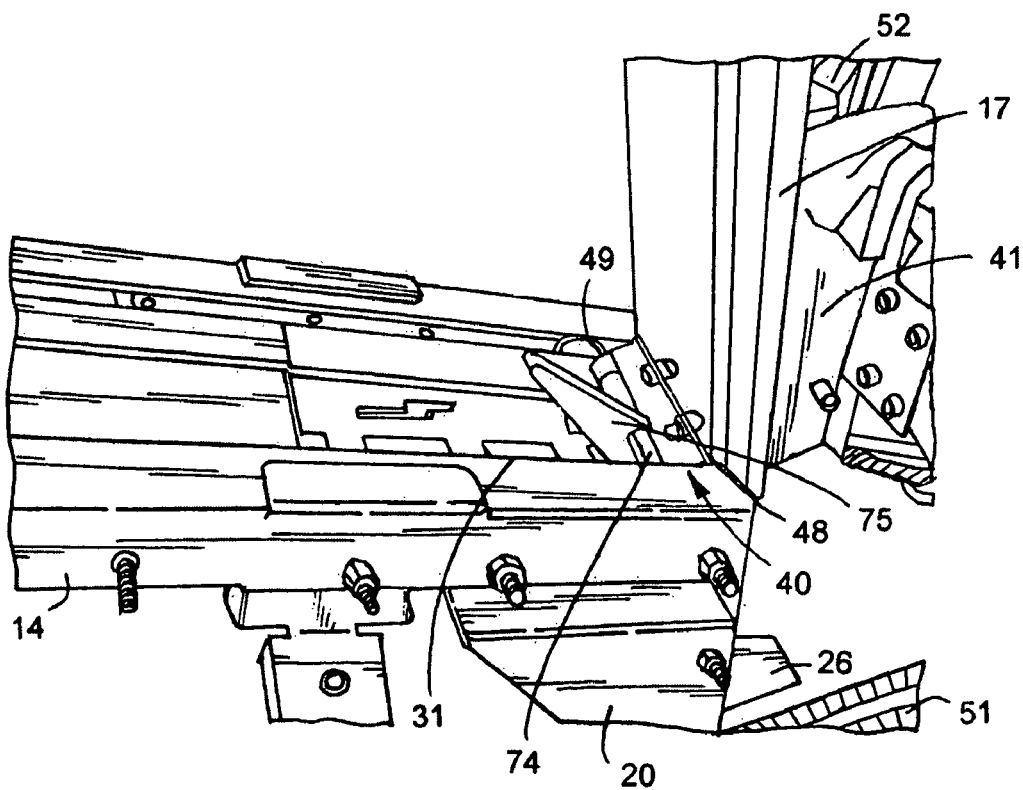
FIG. 10 is a perspective view showing the upper track in a pivotable relationship to the lower track and showing the pawl member.
Figure 11:
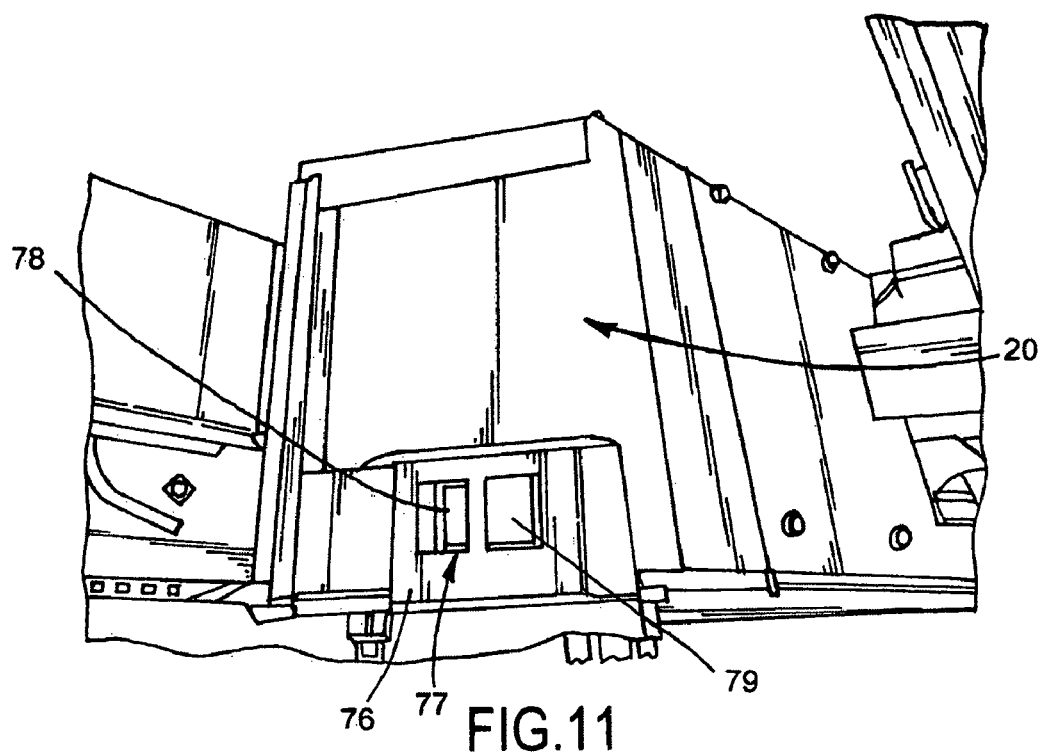
FIG. 11 shows the activation switch of the motorized assembly.
Figure 12:
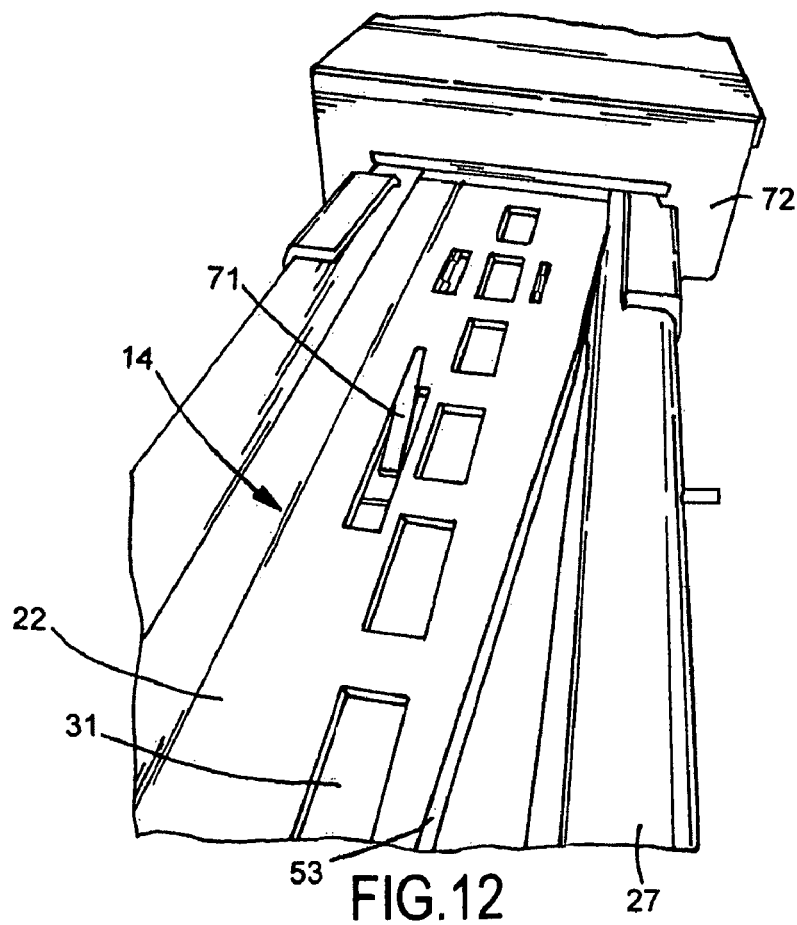
FIG. 12 shows the upper stop switch of the motorized assembly.
Figure 13:
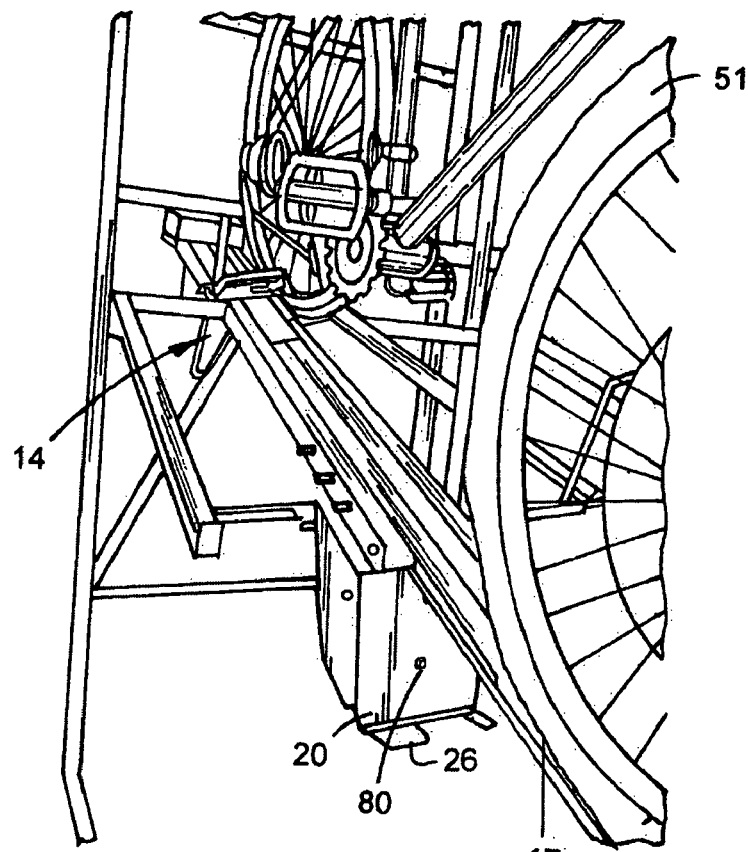
FIG. 13 shows the lower stop switch of the motorized assembly.
Figure 14:
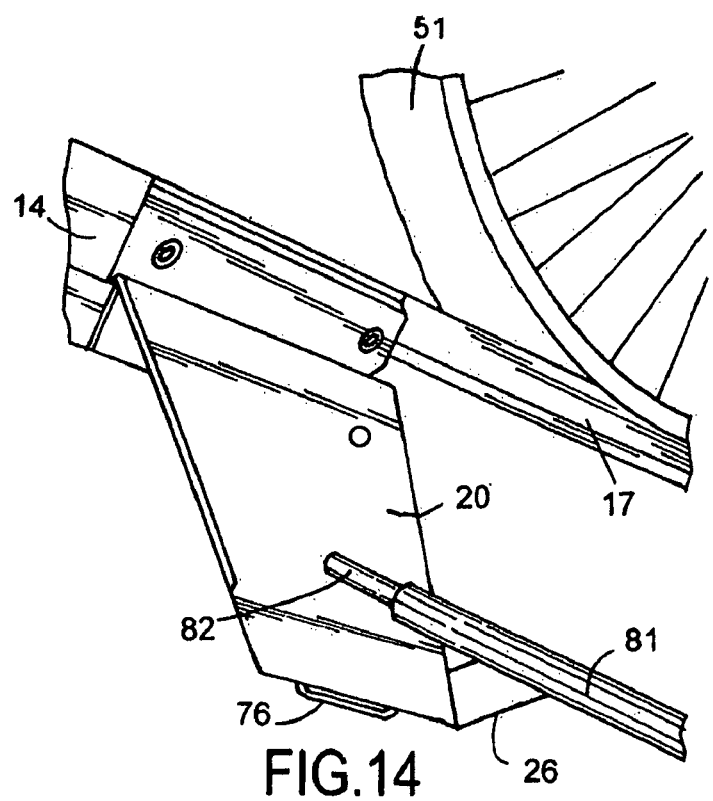
FIG. 14 shows a tool member for activating the switch of the motorized assembly of the invention.

FIG. 2 shows upper track 17 in a pivoting relationship with respect to lower track 14 whereby bicycle 50 is readily available for removal from the storage assembly 10. Guide members 26 are shown in FIGS. 10, 13 and 14 and which guide upper track 17 into place centered on front guide structure 20 when in a fully tilted position. Referring further to FIGS. 3 and 4, a motor assembly 23 is shown mounted to the upper end of lower track 14. The motor assembly 23 is shown having a motor 54, a gear reduction device 55, a rotatable shaft 56 and opposing mounting plates 57 and 58. Cable 53 is shown attached at one end for winding about shaft 56 and secured to the bottom of the upper track 17. Although this embodiment 10 shows the pivoting relationship between upper track 17 and lower track 14, it is within the purview of the present invention to provide a motorized system whereby the upper track 17 only slides with respect to lower track 14 and is powered by motor assembly 23.

Referring to FIGS. 3 and 10, the lower track 14 is shown having a plurality of aligned apertures 31 which cooperate with the pivotable pawl member 75 attached to the upper track 17 via plate member 48 of upper track roller assembly 40. The plate member 48 is shown to have rollers 49. The pawl member 75 pivots with or about shaft 74, as shown in FIG. 10, as the pawl member moves through and over apertures 31 as the upper track 17 moves up or down. This arrangement provides a safety feature for the assembly 10 whereby a motor, brake or cable failure results in the pawl member 75 to engage and lock into one of the aligned apertures 31 of the bottom surface 22 of the lower track 14 to thereby prevent the further downward movement of the upper track 17 with respect to the lower track 14. During normal movement of the upper track the terminal portion of the pawl body rides over each aperture, however, when movement is accelerated due to a cable failure, for example, the pawl moves up and down rapidly to thereby engage in an aperture to lock or fix the upper track with respect to the lower track.

Referring to FIGS. 3-6, the motor assembly 23 is shown having a cover or housing 72 to contain the motor 54, gear reduction device 55, brake 59 and rotatable shaft 56. The cable 53 is shown extending through the opening of the housing 72.

The motor assembly 23 preferably has brake means 59 which prevents the turning of the rotatable shaft 56 unless powered by the motor. Brake devices for electric motors known in the art may be utilized.

Figure 8:
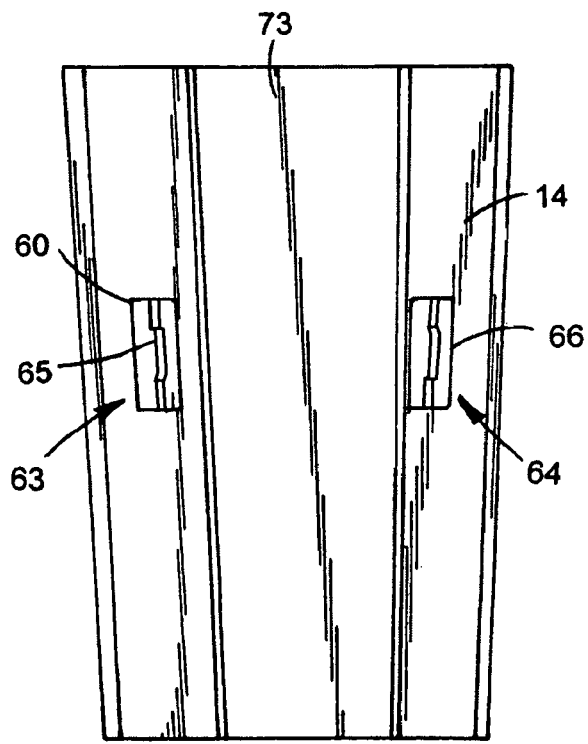
FIG. 8 is a perspective view showing the dogs of the pivotable plate assembly engaging cooperating apertures released from the lower track.

As shown particularly in FIGS. 5-8, a movable pivotable plate 60 is provided for movement by means of wheels 67 and 68 in channels 27 and 28 of lower track 14. The plate 60 has a roller 62 with a centrally disposed groove for cable 53. The roller 62 and wheels 67 and 68 are supported by an axle or shaft 61 about which the plate 60 pivots. As shown in FIG. 8 the plate 60 has a pair of dogs 65 and 66 which extend into openings 63 and 64 in the bottom of lower track 14 to thereby lock the plate 60 in place with respect to lower track 14 to thereby allow the upper track 17 to pivot with respect to the lower track 14. The plate 60 is shown having a slot 70 through which cable 53 extends during the pivoting motion of upper track 17. The front end 69 of plate 60 abuts the rear wheel roller 38 structure for movement along the lower track 14. Bottom wire housing 73 is shown disposed along the bottom of lower track 14 and which houses wires for limit switches and upper track movement switches, etc.

Figure 9:
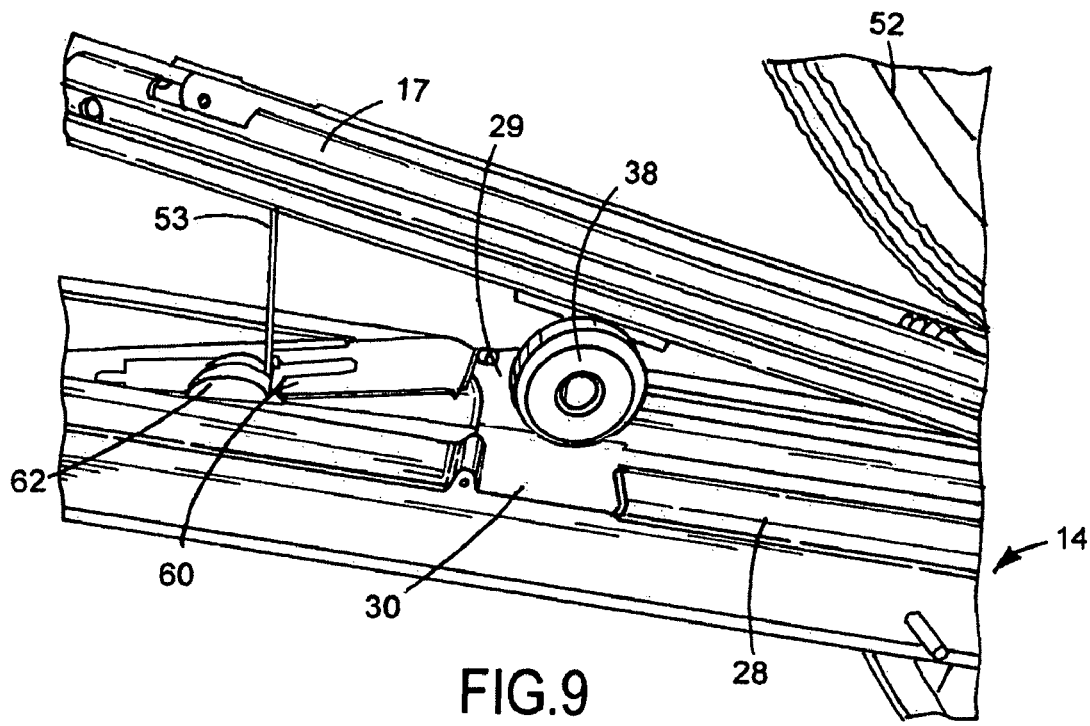
FIG. 9 is a perspective view showing the rear wheel rollers of the upper track released from the lower track.

FIG. 9 shows the movement of the upper track 17 with respect to the lower track 14. The rear wheel rollers 38 of upper track 17 are shown positioned above the channel openings 29 and 30 of lower track 14. The rear wheel rollers 38 are shown released through channel openings 29 and 30 as cable 53 allows the upper track 17 to pivot with respect to lower track 14. When motor assembly 23 is rewound, the cable 53 pulls and pivots the end of upper track 17 downward to bring the rear wheel rollers 38 through the channel openings 29 and 30. When the upper track 17 abuts and is parallel to the lower track 14, the end of rear wheel roller 38 assembly abuts front end 69 of the plate 60 and the upper track 17 along with plate 60 moves upward to return the upper track to its original position.

Referring to FIGS. 11-14, the motor assembly 23 is shown to be activated by a switch structure 77 mounted to the front guide structure 20 of the lower track 14. The switch structure 77 is shown being a toggle switch with a cover member 76 having two apertures 78 and 79. Thereby the secured toggle switch may be activated by means of a tool member 81 having a terminal end 82 with a diameter capable of extending through the cover apertures 78 and 79 to engage the toggle switch as shown and to cause the motor to wind or unwind the cable 53 thereby moving the upper track 17 up or down. The cover plate is preferable marked up or down or having a like designation. Other switch mechanisms may be utilized as known in the art. The switch may also be positioned in other locations. An upper limit switch 71 positioned at the top end of the assembly 10 stops the motor assembly 23 when that position is reached. A lower limit switch 80, shown particularly in FIG. 13, is positioned on front guide structure 20 such that upper track 17 will engage the switch 80 when in fully tilted position to therein stop the motor.

The motor assembly is preferably a small DC motor having a gear reduction assembly attached thereto and which generates approximately 40 lbs of torque. The motor is preferably operated by 110 AC/DC converter and is activated by an up/down switch. An upper limit switch and a lower switch positioned with respect to the lower track are also provided to stop the motor when the upper track moves up and down the lower track. The up/down switch may also be mounted in an elevated position so that a wand is utilized to activate the switch. The elevated position for the switch is to prevent accidental activation.

As shown particularly in FIGS. 1 and 2, the rear trolley 18 which rides in upper track 17 and which holds the rear wheel of a bicycle, is similar to the rear trolley disclosed in the '441 Application. Namely, the wheel retention structures and rear wheel lock are generally similar structures. Further, the front wheel holder 19 is generally the same structure as is the lower track nose assembly having a guide and securement means for receiving and securing the upper track in a tilted position with respect to the lower track.

The primary elements provided and utilized in the motorized assembly of the present invention are the motor assembly having the attached gear reduction device and windable cable structure. Importantly, the pivotable plate structure 60 allows the cable 53 to control the movement of the upper track with respect to the lower track. The channel openings 29 and 30 in the channels 28 and 27 in combination with the pivotable plate allow the rear wheel rollers 38 to release the upper track from the lower track to thereby provide a user to remove or place a bicycle from the downwardly extending upper track.

As many changes are possible to the motorized bicycle storage and retrieval assembly of this invention, utilizing the teachings thereof, the description above and the accompanying drawings should be interpreted in the illustrative and not the limited sense.

That which is claimed is:

1. A bicycle storage and retrieval assembly for a storage rack structure comprising:
    a) a mounting structure for attachment to the storage rack structure;
    b) a lower track assembly secured to said mounting structure, said lower track having a plurality of apertures;
    c) an upper track assembly, constructed and arranged to be slidable and pivotable with respect to said lower track assembly and further having means to hold a bicycle, said upper track having a pivotable pawl for engaging said apertures of said lower track at a predetermined rate of movement;
    d) a motor assembly with a brake mechanism, a gear reduction device, a lower stop switch, an upper stop switch and an up/down switch, said motor assembly further having a shaft with means for moving said upper track assembly with respect to said lower track assembly;
    e) a pivotable upper track plate assembly attached to said upper track assembly and positioned for movement in said lower track assembly; and
    f) said means to hold a bicycle including a front wheel cage structure and a rear wheel securement assembly and said rear wheel securement assembly including a movable base member having rollers, at least one cage structure and a locking structure for engaging a bicycle wheel.

2. The bicycle storage and retrieval assembly of claim 1, wherein a movable lower track pivotable plate is provided for movement in said lower track assembly, said movable lower track pivotable plate having a pair of dogs extending downwardly therefrom and wherein said lower track has a pair of holes in alignment with said pair of dogs.

3. The bicycle storage and retrieval assembly of claim 1, wherein said upper track assembly includes a release mechanism for releasing said front wheel cage structure to pivot with respect to said upper track assembly.

4. The bicycle storage and retrieval assembly of claim 1, wherein said upper track assembly has rollers and wherein said lower track assembly has opposing side channels constructed and arranged to receive said rollers to thereby move said upper track assembly with respect to said lower track assembly.

5. The bicycle storage and retrieval assembly of claim 4, wherein said lower track assembly includes release apertures in said side channels having guide means through which said rollers pass to permit said upper track assembly to pivot with respect to said lower track assembly.

6. The bicycle storage and retrieval assembly of claim 5, wherein said lower track assembly has a nose assembly at one end and wherein said nose assembly includes a guide and securement means for receiving and securing said upper track assembly in a tilted position with respect to said lower track assembly.

7. The bicycle storage and retrieval assembly of claim 6, wherein said guide and securement means is a pair of angled guide walls constructed of spring steel.

8. The bicycle storage and retrieval assembly of claim 1, wherein said upper track assembly includes a stop means to stop said rear wheel securement assembly from moving along said upper track assembly.

9. The bicycle storage and retrieval assembly of claim 5, wherein said motor assembly is connected to and operative between said lower track assembly and said upper track assembly, wherein said means for moving said upper track assembly with respect to said lower track assembly is a windable cable and wherein said shaft forms a winding spool for said windable cable, said windable cable connecting said winding spool and said upper track assembly.

10. A bicycle storage and retrieval assembly comprising:
    a) a frame structure;
    b) a lower track assembly secured to said frame structure;
    c) an upper trolley track assembly, constructed and arranged to be slidable and pivotable with said lower track assembly and further having means to hold a bicycle;
    d) a motor assembly operative between said lower track assembly and said upper trolley track assembly, said motor assembly having a shaft with means for interconnecting said upper trolley track assembly with said lower track assembly and for moving said upper trolley track assembly with respect to said lower track assembly, said motor assembly further having an activation switch, an upper stop switch and a lower stop switch; and
    e) said motor assembly further having a gear reduction device and a brake device, said activation switch of said motor assembly being a toggle switch and said upper and lower stop switches being mounted on said lower track assembly and further wherein a wand with a terminal end is provided to activate said activation switch.

11. The bicycle storage and retrieval assembly of claim 10, wherein said assembly includes a movable lower track pivotable plate having a pair of dogs extending downwardly therefrom.

12. The bicycle storage and retrieval assembly of claim 10, wherein said means to hold a bicycle includes a front wheel cage structure and a rear wheel securement assembly and wherein said upper track assembly includes a stop means to stop said rear wheel securement assembly from moving along said upper track assembly and wherein said rear wheel securement assembly includes a movable base member having rollers, at least one cage structure and a locking structure for engaging a bicycle wheel.

13. The bicycle storage assembly of claim 12, wherein said upper track assembly includes a release mechanism for releasing said front wheel cage structure to pivot with respect to said upper track assembly.

14. The bicycle storage and retrieval assembly of claim 10, wherein said upper track assembly has rollers and wherein said lower track has opposing side channels constructed and arranged to receive said rollers and wherein said lower track assembly includes release apertures in said side channels having guide means through which said rollers pass to permit said upper track assembly to pivot with respect to said lower track assembly.

15. The bicycle storage and retrieval assembly of claim 14, wherein said lower track assembly has a nose assembly at one end and wherein said nose assembly includes a guide and securement means for receiving and securing said upper track assembly in a tilted position with respect to said lower track assembly.

16. The bicycle storage and retrieval assembly of claim 15, wherein said guide and securement means is a pair of angled guide walls constructed of spring steel.

17. A bicycle storage and retrieval assembly comprising:
 a) a frame structure;
 b) a lower track assembly having a plurality of apertures and being secured to said frame structure;
 c) an upper trolley track assembly having a pivotable upper track plate assembly attached thereto which is positioned for movement in said lower track assembly so that said upper trolley track assembly is constructed and arranged to be slidable and pivotable with said lower track assembly, said upper trolley track assembly having a pivotable pawl for engaging said apertures at a predetermined rate of movement, said upper trolley track assembly further having means to hold a bicycle including a front wheel cage structure and a rear wheel securement assembly, said rear wheel securement assembly having a movable base member having rollers, at least one cage structure and a locking structure for engaging a bicycle wheel; and
 d) a motor assembly operative between said lower track assembly and said upper trolley track assembly and having a lower stop switch, an upper stop switch and an up/down switch.

* * * * *

UNITED STATES PATENT AND TRADEMARK OFFICE
CERTIFICATE OF CORRECTION

| | | |
|---|---|---|
| PATENT NO. | : 7,922,009 B1 | Page 1 of 1 |
| APPLICATION NO. | : 12/070581 | |
| DATED | : September 25, 2007 | |
| INVENTOR(S) | : Herring | |

It is certified that error appears in the above-identified patent and that said Letters Patent is hereby corrected as shown below:

Front Page, Column 2, delete the fourth listed prior art reference "6,883,649 B2 4/2005 Lun".

Front Page, Column 2, delete the "OTHER PUBLICATIONS" and the publication listed Gen 3 Rod Guide Offered For Sale In The United States On Or About Oct. 1, 2006.".

Signed and Sealed this
Fourteenth Day of June, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,922,009 B1 | Page 1 of 1 |
| APPLICATION NO. | : 12/070581 | |
| DATED | : April 12, 2011 | |
| INVENTOR(S) | : Roger Charles Larson | |

It is certified that error appears in the above-identified patent and that said Letters Patent is hereby corrected as shown below:

Front Page, Column 2, delete the fourth listed prior art reference "6,883,649 B2 4/2005 Lun".

Front Page, Column 2, delete the "OTHER PUBLICATIONS" and the publication listed "Gen 3 Rod Guide Offered For Sale In The United States On Or About Oct. 1, 2006.".

This certificate supersedes the Certificate of Correction issued June 14, 2011.

Signed and Sealed this
Twenty-third Day of August, 2011

David J. Kappos
*Director of the United States Patent and Trademark Office*